United States Patent
Meyer

(10) Patent No.: US 6,490,942 B1
(45) Date of Patent: Dec. 10, 2002

(54) SPINDLE DRIVE HAVING ENCASED SPINDLE NUT WITH BREAK-FREE MOMENT REDUCING OPPOSITE END COLLARS

(75) Inventor: Stephan Meyer, Bielefeld (DE)

(73) Assignee: Bertrand Faure Sitztechnik GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/665,644

(22) Filed: Sep. 19, 2000

(30) Foreign Application Priority Data

Sep. 20, 1999 (DE) .......................... 199 44 961

(51) Int. Cl.⁷ .................................. B60N 2/16
(52) U.S. Cl. ............ 74/89.37; 74/89.36; 297/344.14; 297/344.17
(58) Field of Search ............. 74/89.36, 89.37; 192/141; 297/344.17, 344.14

(56) References Cited

U.S. PATENT DOCUMENTS

| | | | |
|---|---|---|---|
| 2,857,776 A | * 10/1958 | Williams et al. | 74/89.37 |
| 2,979,965 A | * 4/1961 | Diebold | 192/141 |
| 3,337,732 A | * 8/1967 | Popcensky | 74/89.36 |
| 4,666,026 A | * 5/1987 | Poulin | 192/141 |
| 4,739,673 A | * 4/1988 | Ishikawa et al. | 192/141 |
| 5,134,731 A | * 8/1992 | Quintile et al. | 192/141 |
| 5,461,935 A | * 10/1995 | Hill | 74/89.37 |

\* cited by examiner

Primary Examiner—William C Joyce
(74) Attorney, Agent, or Firm—Flanagan & Flanagan; John R. Flanagan

(57) ABSTRACT

A spindle drive for adjusting structural components of a motor vehicle seat relative to one another includes a casing having opposite end walls with openings therein, a spindle nut disposed in the casing and having a pair of opposite ends and an internally threaded bore extending therethrough between the opposite ends and generally aligned with the openings in the opposite end walls of the casing, an externally threaded spindle extending through the casing and openings of the end walls thereof and also threadably received through the internally threaded bore of the spindle nut so as to extend in opposite directions from the opposite ends of the spindle nut, the spindle having an end stop attached thereon such that one of the opposite ends of the spindle nut faces toward the end stop on the spindle, and at least one collar attached to and extending outwardly from the one end of the spindle nut and about the spindle and having an end surface facing toward the end stop on the spindle such that as the spindle is rotated in a predetermined direction relative to the casing and spindle nut the end stop advances into contact with the end surface of the end collar but not into contact with the one end wall of the casing such that the end stop limits rotational axial movement of the spindle relative to the spindle nut without contacting the casing whereby a wedging of the end stop with the one end wall of the casing is avoided.

13 Claims, 2 Drawing Sheets

SPINDLE DRIVE HAVING ENCASED SPINDLE NUT WITH BREAK-FREE MOMENT REDUCING OPPOSITE END COLLARS

BACKGROUND OF THE INVENTION

1. Field of the Invention

The present invention relates to a spindle drive for adjusting structural components of a motor vehicle seat which are movable relative to one another and, more particularly, to a spindle drive having an encased spindle nut with break-free moment reducing opposite end collars.

2. Description of the Prior Art

Spindle drives for movably adjusting structural components of a motor vehicle seat relative to one another, are known, for example, from prior art patent documents WO 98/26951 and JP 8156660-A, which include a threaded spindle, a casing and a spindle nut supported in the casing and threadably coupled and running on the threaded spindle. In such spindle drive having an encased spindle nut, a soft form-fitting bearing is provided between the casing and spindle nut and surrounds the circumference of the spindle nut so as to ensure smoothness of running of the spindle nut on the spindle and provide a tolerance compensation for accommodating oblique positions arising between the casing and spindle.

One problem of a spindle drive with an encased spindle nut is that the spindle drive operates against end stops where a strong wedging occurs between the face of the end stop and the parallel front face of the casing. For disengagement of the wedging between the respective faces the generation of a large break-free moment is required for which a suitable motor gearing unit must be provided to operate the spindle drive. This required break-free moment provided by the motor gearing unit is multiple times greater than the torque required for the normal adjustment operation of the spindle drive. Thus, in order for the motor gearing unit to be able to provide the required break-free moment it must be overdesigned and overdimensioned with respect to the normal operational torque of the spindle drive.

In the case of a spindle drive with a non-encased spindle nut, the aforementioned problem is solved by providing the end stops projecting radially from the spindle and by providing corresponding protrusions axially projecting on the front faces of the spindle nut. At the end of the adjustment path the end stops abut the protrusions without contacting the front faces of the spindle nut. Through this arrangement constraints between the threads of the threaded spindle and spindle nut are avoided. Such or similar solutions are known, for example, from prior art patent documents DE 32 38 944 A1, DE 40 19 482 C2 and U.S. Pat. No. 4,858,481.

A need exists for an innovation that will solve the aforementioned wedging problem that occurs in the case of spindle drives with encased spindle nuts. An innovation particularly desired is one that will exploit the presence of the elastic form-fitting bearing, provided in any event between the spindle nut and casing, so as to reduce or avoid entirely the break-free moment requirement.

SUMMARY OF THE INVENTION

The present invention avoids and thus solves the aforementioned wedging problem in the case of a spindle drive with an encased spindle nut by introducing at least one coaxial end collar on at least one of the respective opposite faces of the spindle nut, the coaxial collar radially and threadably extending about the threaded spindle and also radially spaced from and extending through an opening in a corresponding one of opposite end walls of the casing so as to provide radial play relative to the casing end wall and define a surface against which a corresponding one of the end stops at one end of the adjustment path can abut such that a wedging of the end stop with the casing end wall is avoided.

The present invention also introduces a plurality of elastic elements which are disposed between the exterior of the spindle nut and interior of the casing and form-fittingly elastically supports the spindle nut in the casing at a plurality of predetermined locations on the circumference of the spindle nut. By such arrangement, the spindle nut, in response to the effect of a torque produced by the rotation of the spindle, can twist slightly against a resiliency force of the elastic elements in the casing. Such a torque acts or is applied onto the spindle nut inter alia during run-up and abutting of the end surface of the coaxial collar onto and against the associated one of the end stops. A prestressing effect is thereby applied onto the elastic elements by the spindle nut which counteracts any jamming of the threads of the spindle nut with the threads of the spindle. Due to such prestressing effect, the spindle nut is rotated back into its normal position when the application of torque by the rotation of the spindle ceases and so the prestressing effect at least reduces, if not eliminates, the requirement for a break-free moment, as in the case of the prior art, since the prestressing effect acts in the same direction.

As a consequence, a motor gearing unit of the spindle drive can be provided or designed for the required operational torque and thus can be dimensioned smaller in comparison to the prior art unit. This constitutes a substantial advantage since weight and space savings play a significant role in motor vehicle construction. Apart from this advantage, the advantages known from the prior art of the elastic bearing supporting the spindle nut in the casing are retained since the spindle nut, due to the radial play between casing opening and the coaxial end collar, can still tilt axially as before.

More particularly, the casing and spindle nut are advantageously provided with rectangular configurations in cross section such that circumferentially spaced corners on the spindle nut have notches defined therein for form-fitting reception of the respective elastic elements which are confined in the notches by the inner edges of associated circumferentially spaced corners on the casing which are located diametrically opposite the notches on the corners of the spindle nut. Due to this arrangement, the spindle nut is retained on its circumference resiliently and form-fittingly by the elastic elements on all sides on the casing walls and the reset force of the elastic elements is even greater, even though the elastic elements do not completely envelop the spindle nut in contrast to the elastic bearing of the prior art.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
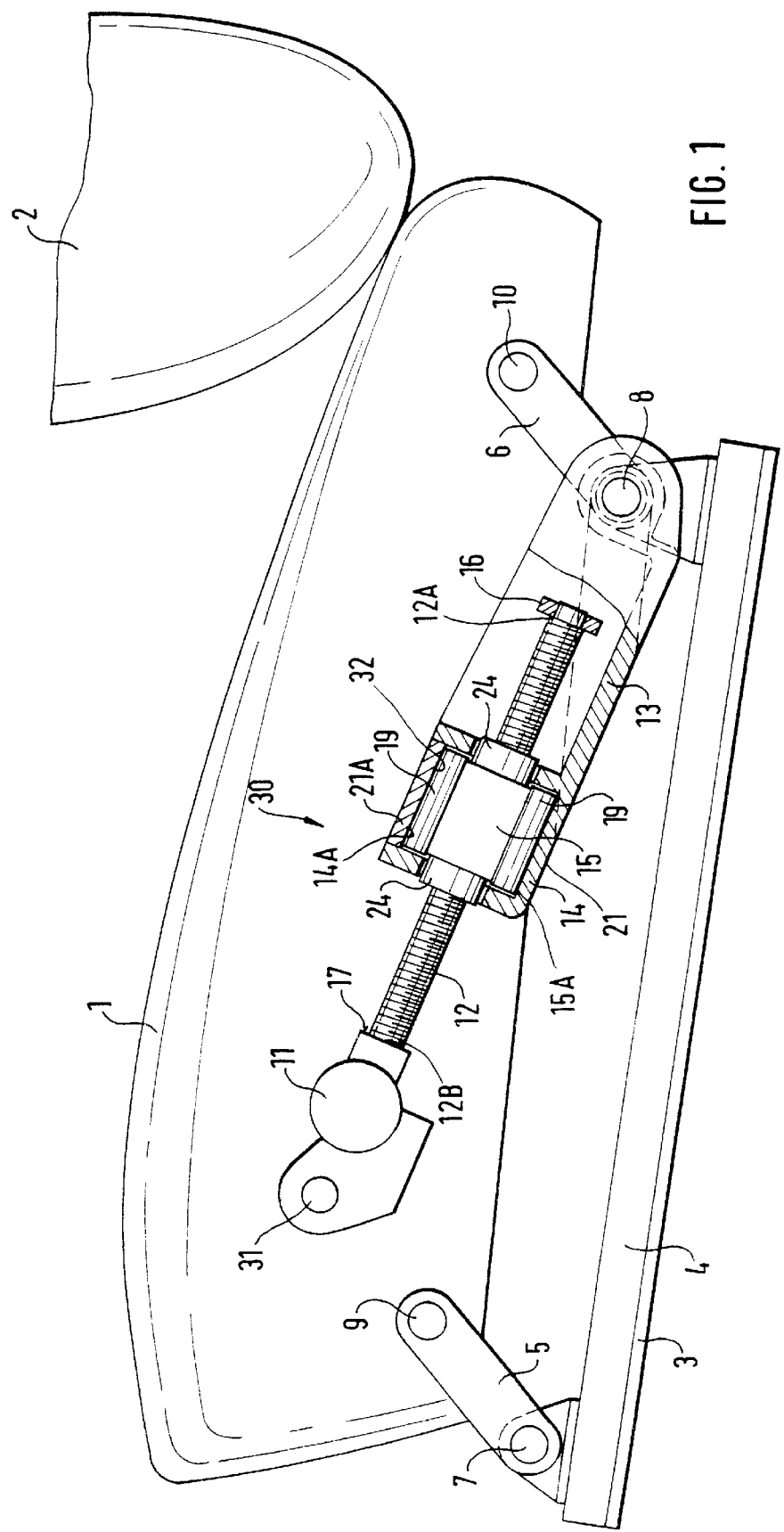
FIG. 1 is a side elevational view of a motor vehicle seat having a spindle drive of the present invention integrated into a seat height adjustment mechanism with portions of the spindle drive shown broken away and sectioned.

Referring to the drawings and particularly to FIG. 1, there is illustrated a seat component 1 and a back rest 2 of a motor vehicle seat. This seat is equipped with length and height adjustments. For length adjustment, lower and upper rails 3, 4 are provided on each side of the seat such that the upper rail 4 is fixable to and runs in the lower rail 3. The lower rails 3 are fastened on a chassis body (not shown) of a vehicle. The height adjustment realized as a parallelogram adjustment includes front guide links 5 and rear guide links 6 provided on both sides on the seat. The guide links 5, 6 are connected in respective articulation points 7, 8 with swivel joints on the upper rails 4 and in articulation points 9, 10 with swivel joints on the seat component 1.

Figure 2:
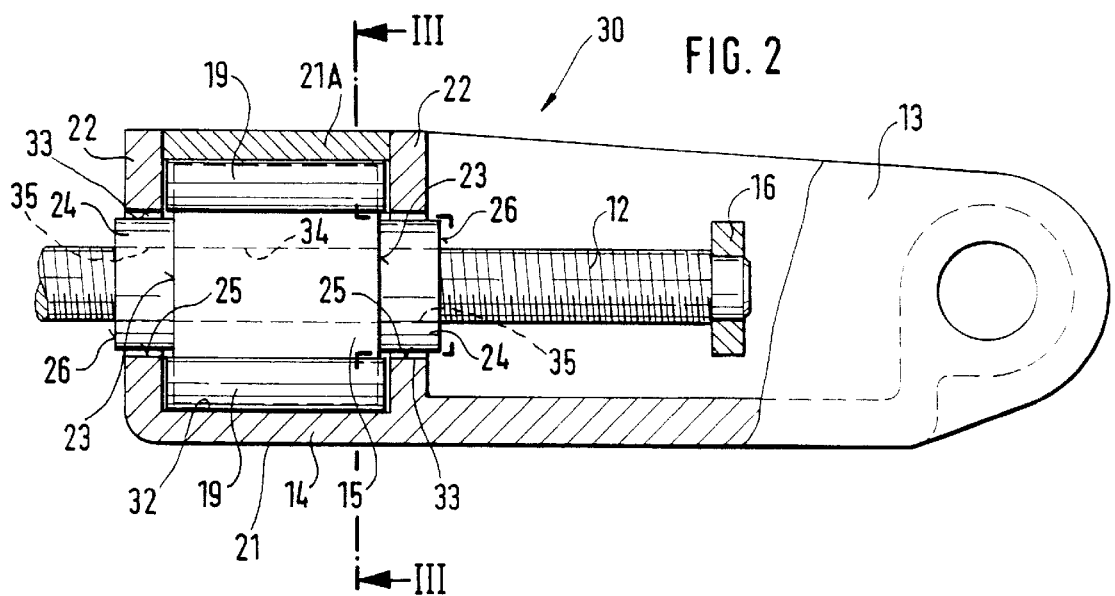
FIG. 2 is an enlarged fragmentary view of the spindle drive shown in FIG. 1.
Figure 3:
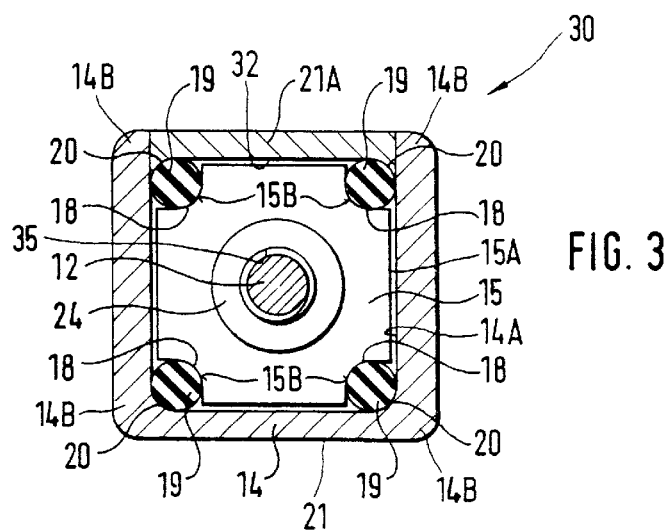
FIG. 3 is a transverse view of the spindle drive taken along line 3—3 of FIG. 2 showing an end of the spindle nut of the spindle drive, a cross section of the casing encasing the spindle nut and cross sections of the corner elastic elements supporting the spindle nut in the casing.

To drive the parallelogram height adjustment a spindle drive 30 of the present invention is provided, as shown in FIGS. 1–3. The spindle drive 30 includes a rotary power means such as in the form of a motor-gearing unit 11, an elongated externally threaded spindle 12 which is rotatably driven by the motor-gearing unit 11, an elongated arm 13 with a casing 14, and a spindle nut 15 received in the casing 14 and threadably received about and which runs on the threaded spindle 12 so as to cause the spindle 12 in response to rotation of the spindle 12 in one or the other of opposite clockwise and counterclockwise directions to axially move along a reciprocal axial adjustment path relative to the spindle nut 15. The spindle drive 30 is connected on one end in an articulation point 31 by swivel joints mounted to the seat component 1 and on an opposite end in the articulation point 8 with swivel joints mounted on one of the upper rails 4. By operating the motor-gearing unit 11 so as to rotatably drive the threaded spindle 12 to axially move toward the left as viewed in FIG. 1 the seat is raised, whereas by the rotatably driving the threaded spindle 12 to axially move toward the right as viewed in FIG. 1 the seat is lowered. To limit these movements, end stops are provided, which on the right end 12A of the spindle is in the form of a disk 16 seated or attached on the threaded spindle 12 and on the left end 12B of the spindle 12 is a front side 17 of the motor-gearing unit 11 at where it is drivingly coupled to the left end 12B of the spindle 12.

The casing 14 on the elongated arm 13 has a sidewall 21 with a pair of opposite end walls 22 disposed at opposite ends of the sidewall 21 which define therebetween an interior cavity 32 surrounded by the sidewall 21. The end walls 22 project radially from the sidewall 21 toward the spindle 12 to respective internal continuous edges 33 formed in the end walls 22 and defining openings 25 therethrough being oppositely aligned with one another and spaced from the sidewall such that the threaded spindle 12 can extend through the interior cavity 32 of the casing 14 and the openings 25 of the end walls 22 of the casing 14 as seen in FIGS. 1 and 2. Also, the sidewall 21 of the casing 14 includes a cover 21A which closes the sidewall 21 at the top.

The spindle nut 15 in the casing 14 has a pair of opposite ends 23 disposed adjacent to the respective opposite end walls 22 of the casing 14. The spindle nut 15 defines an internally threaded bore 34 extending therethrough between the opposite ends 23 and generally aligned with the openings 25 in the opposite end walls 22 of the casing 14 such that the externally threaded spindle 12 in extending through the casing 14 and the openings 25 of the end walls 22 thereof is also threadably received through the internally threaded bore 34 of the spindle nut 15 so as to extend in opposite directions from the opposite ends 23 of the spindle nut 15. The opposite ends 23 of the spindle nut 15 face in opposite directions toward corresponding ones of the end stops 16, 17.

The spindle drive 30 of the present invention also includes at least one and preferably a pair of coaxial pins or collars 24. Each collar 24 is attached to and extends outwardly from a corresponding one of the opposite ends 23 of the spindle nut 15 and extends about the spindle 12 and has an end surface 26 facing toward the corresponding one of the end stops 16, 17. Preferably, the collars 24 are of tubular cylindrical configuration, formed integrally with the spindle nut 15, and having holes 35 therethrough in which the inner or internal threads of the spindle nut 15 are continued such that the spindle 12 is also threadably received through the collars 24. The collars 24 extend through the openings 25 of opposite end walls 22 of the casing 14 and project slightly beyond them, as is best seen in FIG. 2. The diameter of the interior continuous edges 33 in the end walls 22 of the casing 14 defining the openings 25 is selected such that sufficient radial play is present with respect to the collars 24 whereby the conventional tolerance compensation function of the spindle nut 15 is ensured. Each of the collars 24 has an end surface 26 that cooperates with a corresponding one of the end stops 16, 17, as was described earlier. As the threaded spindle 12 is rotated in a predetermined direction relative to the casing 14 and spindle nut 15 the respective one of the end stop 16, 17 upon reaching the end of the axial adjustment path of the spindle 12 advances into contact with the end surface 26 of the corresponding one of the collars 24 but not into contact with the corresponding one of the end walls 22 of the casing 12 such that the respective end stop 16, 17 will limit rotational axial movement of the spindle 12 relative to the spindle nut 15 without contacting the casing whereby a wedging contact of the one end stop 16, 17 with the one end wall 22 of the casing 14 is avoided. Thus, by provision of the collars 24 at the opposite ends 23 of the spindle nut 15 a simple solution is provided to avoid or decrease the otherwise required break-free moment in view that neither of the end stops 16, 17 will make a wedging contact with the end walls 22 of the casing 14.

The spindle drive 30 of the present invention further includes means for elastically supporting the spindle nut 15 within the interior cavity 32 of the casing 14 for accommodating a twisting motion of the spindle nut 15 relative to the casing 14 as induced by a torque applied to the spindle nut 15 by rotation of the spindle 12 in threadable contact therewith. The elastically supporting means preferably takes the form of a plurality of elastic elements 19 made of resiliently yieldable material and disposed between an interior surface 14A of the casing and an exterior surface 15A of the spindle nut 15 at locations circumferentially spaced apart about the casing 14 and spindle nut 15 so as to elastically support the spindle nut 14 in the casing 14. Each of the elastic elements 19 is preferably made of rubber and has an elongated rod-like cylindrical configuration.

The casing 14 and spindle nut 15 each has a generally rectangular configuration in cross section and respective circumferentially spaced corners 14B, 15B thereon. The corners 15B of the spindle nut 15 have notches 18 of generally semi-circular cross-sectional shape defined therein so as to extend over the entire axial length of the spindle nut 15 for receiving the elastic elements 19. The corners 14B of the casing 14 define inner edges 20 being located diametrically opposite the notches 18 on the corners 15B of the spindle nut 15 for confining the respective elastic elements 19 in the notches 18 on the corners 15B of the spindle nut 15. The elastic elements 19 have respective lengths corresponding to the interior axial length of the casing 14 and diameters selected such that the elastic elements 19 project above the circumferential surface 15A of the spindle nut 15. The elastic elements 19 brace themselves at the opposing inner casing edges 20, which are rounded off with the radius of the elastic elements 19. The elastic elements 19 are thus disposed form-fittingly between the notches 18 and the inner casing edges 20. The elastic elements 19 made as rubber elements can be produced simply and cost-effectively. In addition, the elastic elements 19 by extending over the entire inner casing length between the opposite end walls 22 of the casing 14 ensure good force introduction into the casing 14.

Due to the above described formation, the spindle nut 15 on its circumferential surface 15A has no contact with the interior surface 14A of the casing 14, but is nevertheless supported via the elastic elements 19 form-fittingly and resiliently in the casing 14. The spindle nut 15 can thereby twist slightly in the casing 14 in both directions under deformation of the elastic elements 19. The radial play relative to the end walls 22 of the casing 14 accommodates the torque induced twisting motion of the spindle nut 15 relative to the casing 14 as the spindle 12 is rotated in one or the other of the rotational direction relative to the casing 14 and spindle nut 15 and as the respective one of the end stop 16, 17 advances into contact with the end surface 26 of the respective one of the collars 24 such that a prestressing effect is induced in the elastic elements 19 by the spindle nut 15 that counteracts any tendency for jamming to occur between the internally threaded spindle nut 15 and the externally-threaded spindle 12 by causing the spindle nut 15 and collars 24 therewith to rotatably move away from the respective end stop 16, 17 upon termination of rotation of the spindle 12.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A spindle drive for adjusting structural components of a motor vehicle seat relative to one another, said spindle drive comprising:
    (a) a casing having opposite end walls with openings therein;
    (b) a spindle nut disposed in said casing and having a pair of opposite ends and an internally threaded bore extending therethrough between said opposite ends and generally aligned with said openings in said opposite end walls of said casing;
    (c) an externally threaded spindle extending through said casing and said openings of said end walls thereof and also threadably received through said internally threaded bore of said spindle nut so as to extend in opposite directions from said opposite ends of said spindle nut, said spindle having an end stop attached thereon such that one of said opposite ends of said spindle nut faces toward said end stop on said spindle;
    (d) at least one collar attached to and extending outwardly from said one end of said spindle nut and about said spindle and having an end surface facing toward said end stop on said spindle such that as said spindle is rotated in a predetermined direction relative to said casing and spindle nut said end stop advances into contact with said end surface of said end collar but not into contact with said one end wall of said casing such that said end stop limits rotational axial movement of said spindle relative to said spindle nut without contacting said casing whereby a wedging of said end stop with said one end wall of said casing is avoided; and
    (e) a plurality of elastic elements disposed between an interior surface of said casing and an exterior surface of said spindle nut at locations circumferentially spaced apart about said spindle nut and elastically supporting said spindle nut in said casing.

2. The spindle drive of claim 1 wherein each of said elastic elements is made of rubber.

3. The spindle drive of claim 1 wherein each of said elastic elements has an elongated cylindrical configuration.

4. The spindle drive of claim 1 wherein said spindle nut has a generally rectangular configuration in cross section and circumferentially spaced corners thereon having notches defined therein for receiving said elastic elements.

5. The spindle drive of claim 4 wherein said casing has a generally rectangular configuration in cross section and circumferentially spaced corners thereon defining inner edges being located diametrically opposite said notches on said corners of said spindle nut for confining said respective elastic elements in said notches on said corners of said spindle nut.

6. The spindle drive of claim 1 wherein each of said elastic elements extends over the length of said casing extending between said opposite end walls thereof.

7. A spindle drive for adjusting structural components of a motor vehicle seat relative to one another, said spindle drive comprising:
    (a) a casing defining an interior cavity and having a pair of opposite end walls with internal continuous edges defining openings through said end walls oppositely aligned with one another;
    (b) a spindle nut disposed in said interior cavity of said casing and having a pair of opposite ends and an internally threaded bore extending through said spindle nut between said opposite ends thereof and generally aligned with said openings in said opposite end walls of said casing;
    (c) an externally threaded spindle extending through said interior cavity of said casing and said openings of said end walls of said casing and threadably received through said internally threaded bore of said spindle nut so as to extend in opposite directions from said opposite ends of said spindle nut, said spindle having an end stop attached thereon such that one of said opposite ends of said spindle nut faces toward said end stop on said spindle;
    (d) means for elastically supporting said spindle nut within said interior cavity of said casing for accommodating a twisting motion of said spindle nut relative to said casing as induced by a torque applied to said spindle nut by rotation of said spindle; and
    (e) at least one collar attached to and extending outwardly from said one end of said spindle nut and having an end surface facing toward said end stop, said end collar also extending about said spindle and through and beyond said opening in one of said end walls of said casing and radially spaced from said internal continuous edge defining said opening in said one end wall of said casing so as to provide radial play relative to said one end wall of said casing for accommodating the torque induced twisting motion of said spindle nut relative to said casing as said spindle is rotated in a predetermined direction relative to said casing and spindle nut said end stop advances into contact with said end surface of said end collar but not into contact with said one end wall of said casing such that said end stop limits rotational axial movement of said spindle relative to said spindle nut without contacting said casing whereby a wedging of said end stop with said one end wall of said casing is avoided and a prestressing effect is induced in said elastic means by said spindle nut that counteracts any tendency for jamming between said internally threaded bore of said spindle nut and said externally-threaded spindle by causing said spindle nut and collar therewith to rotatably move away from said end stop upon termination of rotation of said spindle.

8. The spindle drive of claim 7 wherein said means for elastically supporting said spindle nut includes a plurality of elastic elements disposed between an interior surface of said casing and an exterior surface of said spindle nut at locations circumferentially spaced apart about said spindle nut.

9. The spindle drive of claim 8 wherein each of said elastic elements is made of rubber.

10. The spindle drive of claim 8 wherein each of said elastic elements has an elongated cylindrical configuration.

11. The spindle drive of claim 8 wherein said spindle nut has a generally rectangular configuration in cross section and circumferentially spaced corners thereon having notches defined therein for receiving said respective elastic elements.

12. The spindle drive of claim 11 wherein said casing has a generally rectangular configuration in cross section and circumferentially spaced corners thereon defining inner edges being located diametrically opposite said notches on said corners of said spindle nut for confining said respective elastic elements in said notches on said corners of said spindle nut.

13. The spindle drive of claim 8 wherein each of said elastic elements extends over the length of said casing extending between said opposite end walls thereof.

* * * * *